United States Patent
Soda

(10) Patent No.: US 8,640,069 B2
(45) Date of Patent: Jan. 28, 2014

(54) NOISE ANALYSIS MODEL AND NOISE ANALYSIS METHOD INCLUDING DISPOSING RESISTORS AND SETTING POINTS IN A SEMICONDUCTOR

(75) Inventor: Masaaki Soda, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 0 days.

(21) Appl. No.: 13/546,985

(22) Filed: Jul. 11, 2012

(65) Prior Publication Data

US 2013/0132920 A1     May 23, 2013

(30) Foreign Application Priority Data

Nov. 17, 2011   (JP) ................................. 2011-251475

(51) Int. Cl.
    *G06F 17/50*        (2006.01)
(52) U.S. Cl.
    USPC ........... 716/115; 716/132; 716/133; 716/134; 716/136; 703/1; 703/2; 703/13; 703/14
(58) Field of Classification Search
    USPC .................. 716/115, 132–134, 136; 703/1–4, 703/13–15
    See application file for complete search history.

(56) References Cited

U.S. PATENT DOCUMENTS

| | | | |
|---|---|---|---|
| 7,480,879 B2 * | 1/2009 | Checka et al. | ................ 716/115 |
| 2006/0091550 A1 | 5/2006 | Shimazaki et al. | |

FOREIGN PATENT DOCUMENTS

JP     2006-100718 A     4/2006

OTHER PUBLICATIONS

Joardar, A Simple Approach to Modeling Crosstalk in Integrated Circuit, Oct. 1994, IEEE, vol. 29, No. 10, pp. 1212-1219.*

* cited by examiner

*Primary Examiner* — Nghia Doan
(74) *Attorney, Agent, or Firm* — McGinn Intellectual Property Law Group, PLLC

(57) ABSTRACT

Provided is a noise analysis model and a noise analysis method that can analyze effects of substrate noise on each of elements included in a circuit to be analyzed. The noise analysis model includes first to third resistors. The first resistor serves as a substrate resistor in a semiconductor substrate between a first point set in the semiconductor substrate between a noise source and a transistor to which substrate noise from the noise source propagates through the semiconductor substrate and a second point set in the semiconductor substrate just below a back gate of the transistor. The second resistor serves as a substrate resistor in the semiconductor substrate between the second point and a fixed potential region near the transistor. The third resistor serves as a line resistor of a line connecting the fixed potential region and a power pad that supplies a ground potential.

20 Claims, 20 Drawing Sheets

_(1)_

NOISE ANALYSIS MODEL AND NOISE ANALYSIS METHOD INCLUDING DISPOSING RESISTORS AND SETTING POINTS IN A SEMICONDUCTOR

CROSS-REFERENCE TO RELATED APPLICATIONS

This application is based upon and claims the benefit of priority from Japanese patent application No. 2011-251475, filed on Nov. 17, 2011, the disclosure of which is incorporated herein in its entirety by reference.

BACKGROUND

The present invention relates to a noise analysis model and a noise analysis method and, particularly, to a noise analysis model and a noise analysis method for noise that propagates through a substrate.

A semiconductor device that is incorporated into electronic equipment or the like is subject to noise due to the environment or the effect of another element on a circuit substrate of the semiconductor device. The noise propagates through the substrate of the semiconductor device and causes elements such as transistors formed on the substrate to malfunction. Thus, in order for the semiconductor device to operate normally, it is required to eliminate the effect of noise in the semiconductor device.

Therefore, when designing a semiconductor device, it is necessary to estimate the effect of noise at the design phase and make a circuit layout in consideration of the effect of noise. For this reason, noise analysis is performed at the design phase of a semiconductor device.

A technique to analyze substrate noise that propagates through a substrate of a semiconductor device has been proposed (Japanese Unexamined Patent Application Publication No. 2006-100718). In this technique, the substrate coupling network and the ground line network of the silicon chip are represented by the resistor mesh equivalent circuit. Then, the noise propagation characteristics of the silicon substrate from a circuit that generates noise to a circuit that has noise sensitivity are analyzed by circuit simulation. Further, the circuit that generates noise is analyzed separately by circuit simulation to thereby obtain the amount of generated noise. By integrating those separate element analyses, chip-level noise analysis is realized.

SUMMARY

However, the present inventor has found that the above technique has the following problem. In the above technique, a substrate coupling network and a ground line network of a silicon chip are represented by a resistor mesh equivalent circuit. On the other hand, a typical silicon chip is a rectangle with about several millimeters on one side, having a thickness of about 0.5 millimeters. When the mesh resolution is about 10 micrometers, for example, the number of resistor elements included in the resistor mesh equivalent circuit reaches tens of thousands.

On the other hand, in the recent sub-100 nm CMOS (Complementary Metal Oxide Semiconductor) technology, transistors that form the circuit having noise sensitivity have a size of about 1 micron. Thus, the transistors that form the circuit having noise sensitivity are sufficiently smaller than the mesh resolution of about 10 micrometers. Therefore, to make noise analysis on such minute transistors, the number of resistor elements included in the resistor mesh equivalent circuit further increases. Accordingly, the scale of analysis becomes too broad, which requires an enormous amount of calculation resources. As a result, it is difficult to complete the analysis within a practical allowable time.

A first aspect of the present invention is a noise analysis model including a first resistor that serves as a substrate resistor in a semiconductor substrate between a first point set in the semiconductor substrate between a noise source and a transistor to which substrate noise from the noise source propagates through the semiconductor substrate and a second point set in the semiconductor substrate just below a back gate of the transistor, a second resistor that serves as a substrate resistor in the semiconductor substrate between the second point and a fixed potential region near the transistor, and a third resistor that serves as a line resistor of a line connecting the fixed potential region and a power pad that supplies a ground potential. This enables analysis of noise propagation by using the noise analysis model with a simple structure for elements in a circuit to be analyzed. It is thereby possible to analyze the effects of noise on each of the elements in the circuit to be analyzed beyond the chip level.

A second aspect of the present invention is a noise analysis method including creating a noise analysis model by specifying a position of a transistor in a circuit to be analyzed of a semiconductor device, setting a first point in the semiconductor substrate on a path where substrate noise propagates from a noise source to the transistor through a semiconductor substrate on which the semiconductor device is formed, setting a second point in the semiconductor substrate just below a back gate of the transistor, disposing a first resistor that serves as a substrate resistor in the semiconductor substrate between the first point and the second point at a position between the first point and the second point, disposing a second resistor that serves as a substrate resistor in the semiconductor substrate between the second point and a fixed potential region near the transistor at a position between the second point and the fixed potential region, and disposing a third resistor that serves as a line resistor of a line connecting the fixed potential region and a power pad that supplies a ground potential at a position between the fixed potential region and the power pad; creating a netlist of the circuit to be analyzed containing the noise analysis model; and analyzing an effect of substrate noise reaching the transistor by using the netlist of the circuit to be analyzed. This enables analysis of noise propagation by using the noise analysis model with a simple structure for elements in a circuit to be analyzed. It is thereby possible to analyze the effects of noise on each of the elements in the circuit to be analyzed beyond the chip level.

According to the embodiment of the present invention, it is possible to provide a noise analysis model and a noise analysis method that can analyze the effects of substrate noise on each of elements included in a circuit to be analyzed.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
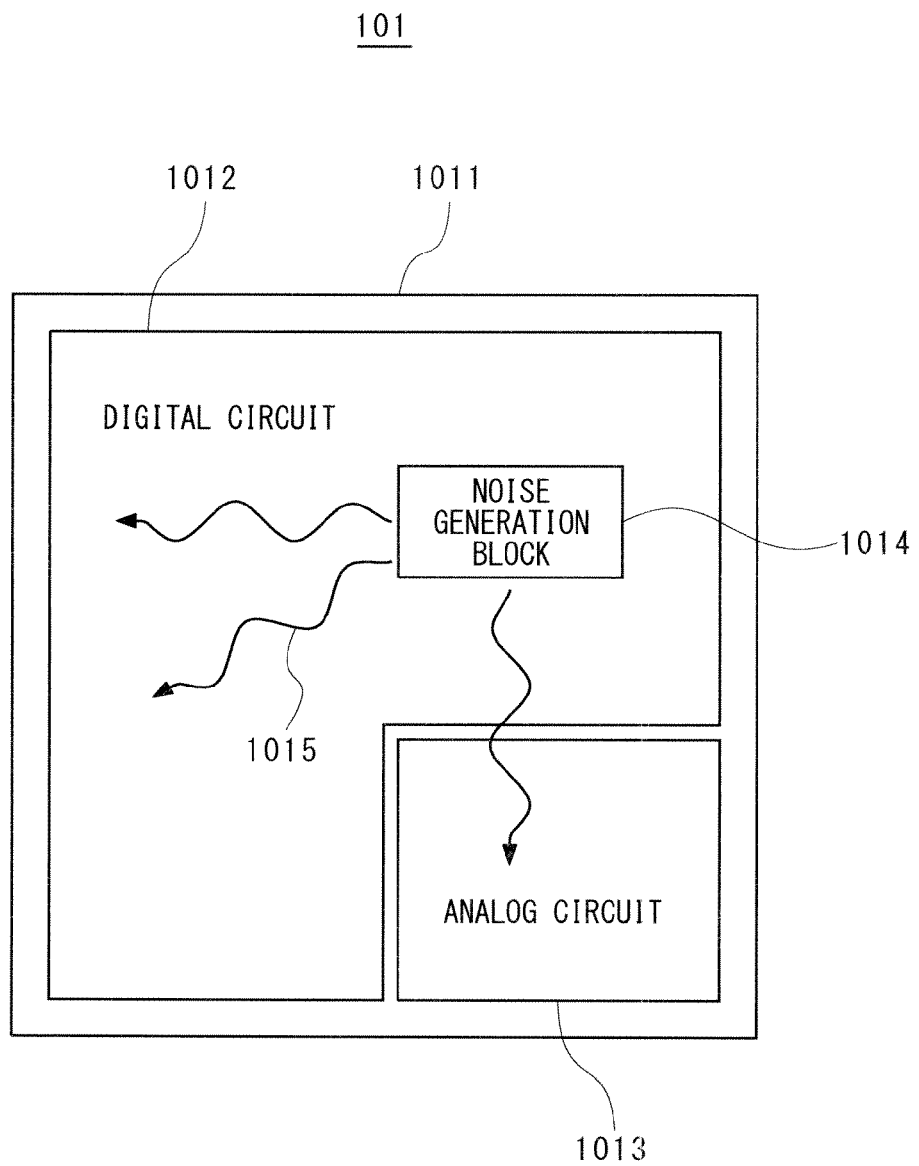
FIG. 1 is a top view schematically showing a structure example of a semiconductor device 101 on which noise analysis is to be made.

Embodiments of the present invention will be described hereinafter with reference to the drawings. In the drawings, the same elements are denoted by the same reference symbols and redundant description will be omitted.

First Embodiment

An element-level noise analysis method according to a first embodiment of the present invention is described hereinafter. First, as a prerequisite to understand the element-level noise analysis method according to this embodiment, propagation of noise in a semiconductor device is described. FIG. 1 is a top view schematically showing a structure example of a semiconductor device 101 on which noise analysis is to be made. As shown in FIG. 1, in the semiconductor device 101 on which noise analysis is to be made, a digital circuit 1012 and an analog circuit 1013 are formed on a semiconductor substrate 1011. The digital circuit 1012 includes a noise generation block 1014, which is a circuit block being a noise source. Noise 1015 is emitted from the noise generation block 1014 to peripheral circuits. The noise 1015 propagates through the semiconductor substrate 1011 and reaches another block of the digital circuit 1012 or the analog circuit 1013. Particularly, the noise 1015 that reaches the analog circuit 1013 causes elements in the analog circuit 1013 to malfunction.

Figure 2:
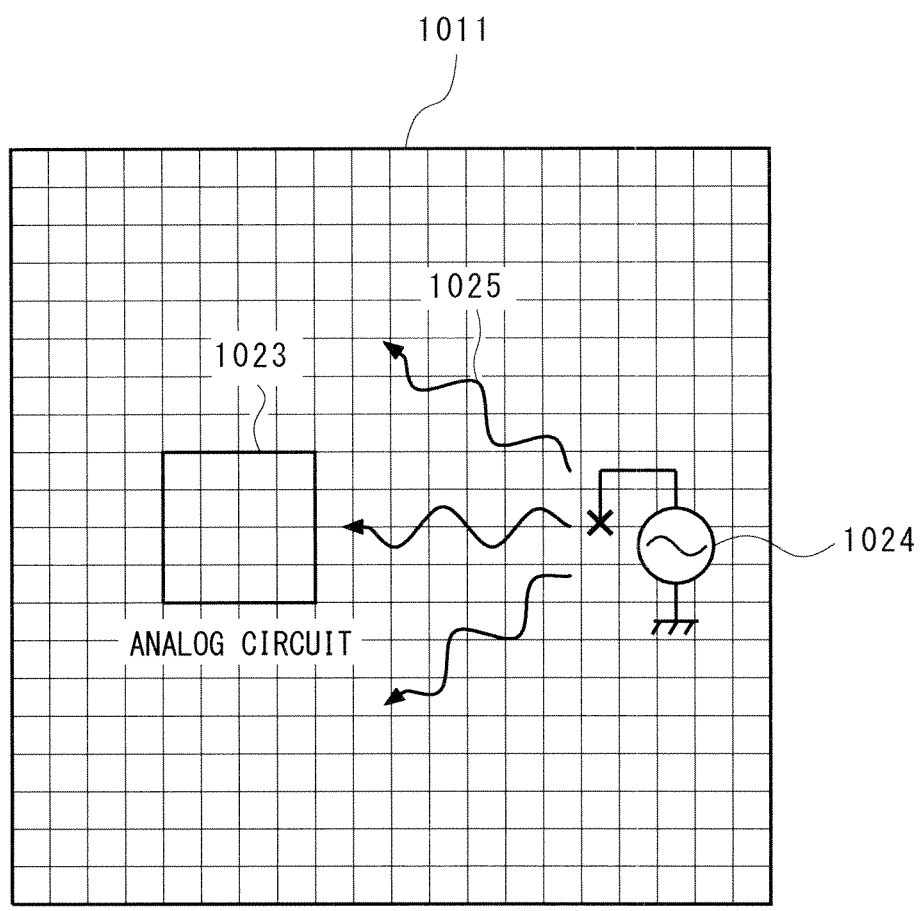
FIG. 2 is a top view schematically showing chip-level noise analysis in a semiconductor device.

Generally, chip-level noise analysis from a noise source to an analog circuit is performed as follows. FIG. 2 is a top view schematically showing chip-level noise analysis in a semiconductor device. In the chip-level noise analysis in a semiconductor device 102, a resistor mesh equivalent circuit is created by segmenting the semiconductor substrate 1011 into resistor mesh. Using the resistor mesh equivalent circuit, the propagation of noise 1025 from a noise source 1024 to an analog circuit 1023 is analyzed.

As described above, because the scale of analysis becomes too broad with only use of the resistor mesh equivalent circuit, element-level noise analysis in the analog circuit 1023 is practically impossible. For example, assuming noise of a sine wave or the like, even if chip-level noise analysis is performed using a resistor mesh equivalent circuit with larger mesh than the size of elements in the circuit having noise sensitivity (analog circuit 1023), only rough evaluation of a response to noise in the circuit having noise sensitivity (analog circuit 1023) can be made. Consequently, the effect of noise on each transistor in the circuit having noise sensitivity cannot be predicted only with the chip-level noise analysis, resulting in low-accuracy noise analysis.

Further, with the future progress towards finer design rules in CMOS process, it is expected that the size of transistors will decrease and the number of transistors included in the circuit having noise sensitivity will increase. Under such circumstances, the accuracy of noise analysis will be further deteriorated.

In view of the above, this embodiment relates to a method of making high-accuracy noise analysis by performing element-level noise analysis with use of a result of chip-level noise analysis. This method is to make noise analysis in consideration of the effect of element-level noise within a feasible processing time by using a noise analysis model for analyzing the effect of element-level noise.

Figure 3A:
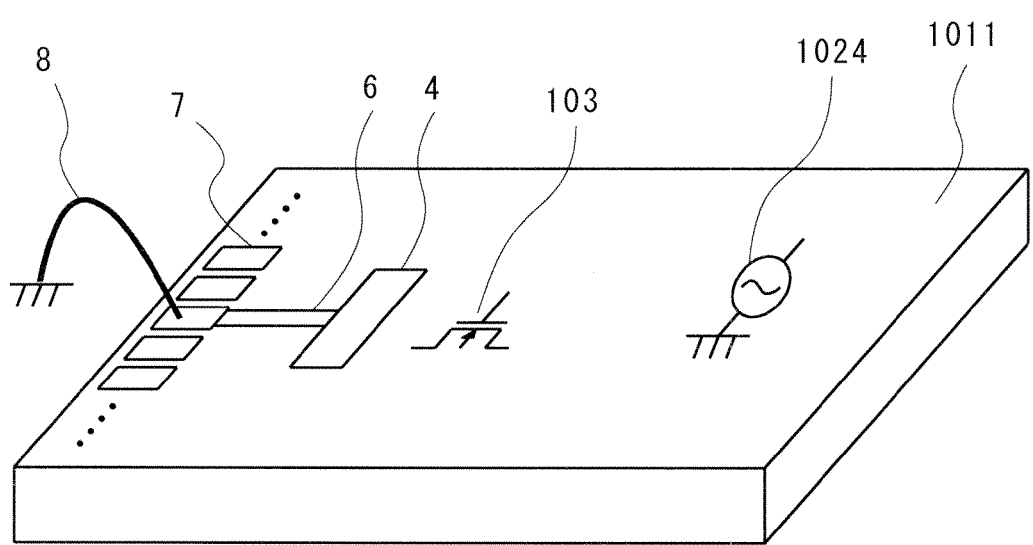
FIG. 3A is a view schematically showing chip-level noise analysis between a noise source on a semiconductor substrate and a connection point.

An element-level noise analysis method according to this embodiment is described hereinafter in detail. The element-level noise analysis method according to this embodiment analyzes noise propagation before and after a connection point at which noise is conducted into an analog circuit. In other words, the method performs analysis of noise at the chip level between the noise source on the semiconductor substrate and the connection point and analysis of noise that propagates through the connection point into an element of the analog circuit. First, the chip-level noise analysis between the noise source on the semiconductor substrate and the connection point is described. FIGS. 3A to 3D are views schematically showing chip-level noise analysis between a noise source on a semiconductor substrate and a connection point. As shown in FIG. 3A, on the semiconductor substrate 1011, a noise source 1024 in the digital circuit, a transistor 103 in the analog circuit, a guard band 4 to shield the analog circuit from noise, a metal line 6 to supply a ground potential to the guard band 4, and a pad 7 to supply a ground potential from the outside are disposed. Noise (not shown) propagates from the noise source 1024 to the transistor 103 through the semiconductor substrate 1011. The pad 7 is connected to the ground potential outside the chip by a wire bonding 8 in the semiconductor package, for example, as shown in FIG. 3A, so that the ground potential is supplied to the pad 7. The method of supplying the ground potential shown in FIG. 3A is one example, and a method other than wire bonding, such as FCBGA (Flip Chip Ball Grid Array) package, may be employed.

Figure 3B:
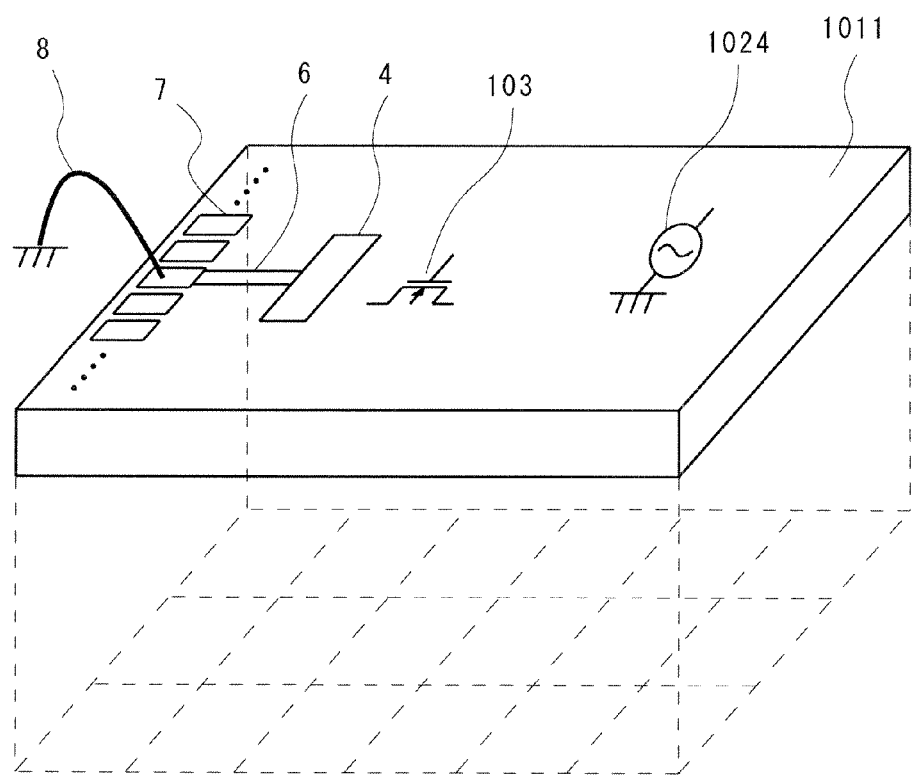
FIG. 3B is a view schematically showing chip-level noise analysis between a noise source on a semiconductor substrate and a connection point.
Figure 3C:
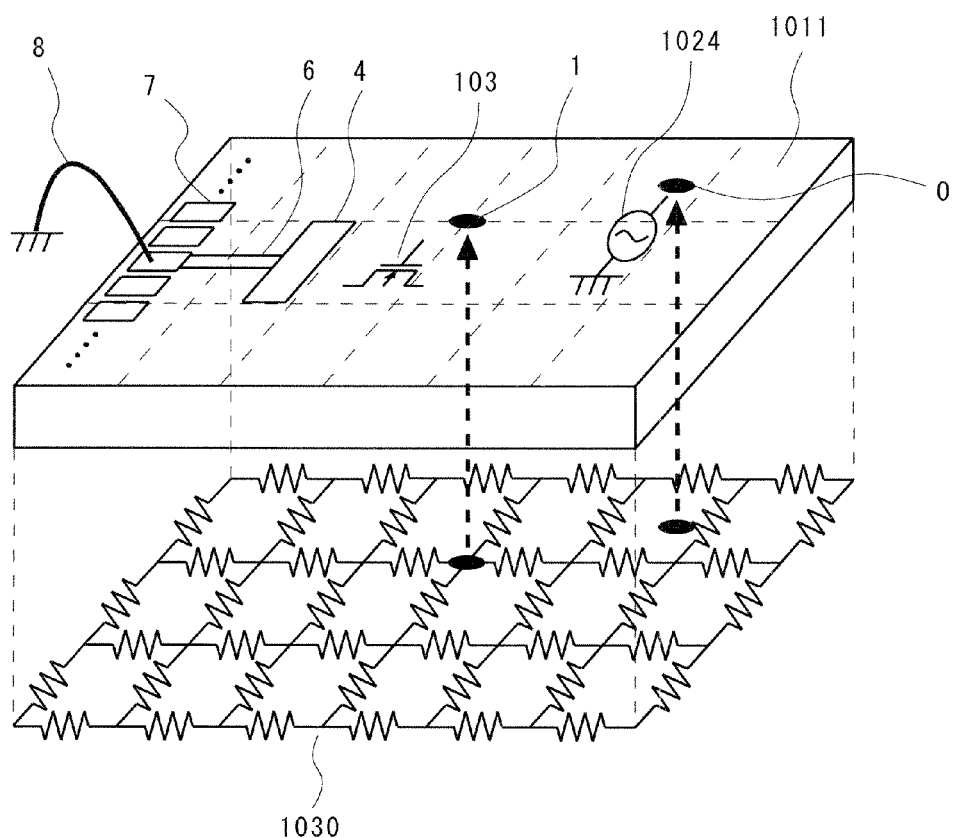
FIG. 3C is a view schematically showing chip-level noise analysis between a noise source on a semiconductor substrate and a connection point.

In the chip-level noise analysis from the noise source 1024 on the semiconductor substrate 1011, the semiconductor substrate 1011 is segmented into mesh all over the chip as shown in FIG. 3B, for example. Then, a substrate coupling network and a ground line network can be represented and analyzed by a resistor mesh equivalent circuit (resistor mesh) 1030 as shown in FIG. 3C. It is assumed that the propagation of noise from the noise source to the transistor is through a connection point 1 (first point), which is one of intersections of the resistor mesh. It is also assumed that a point at which noise is generated from the noise source 1024 is a point 0.

Figure 3D:
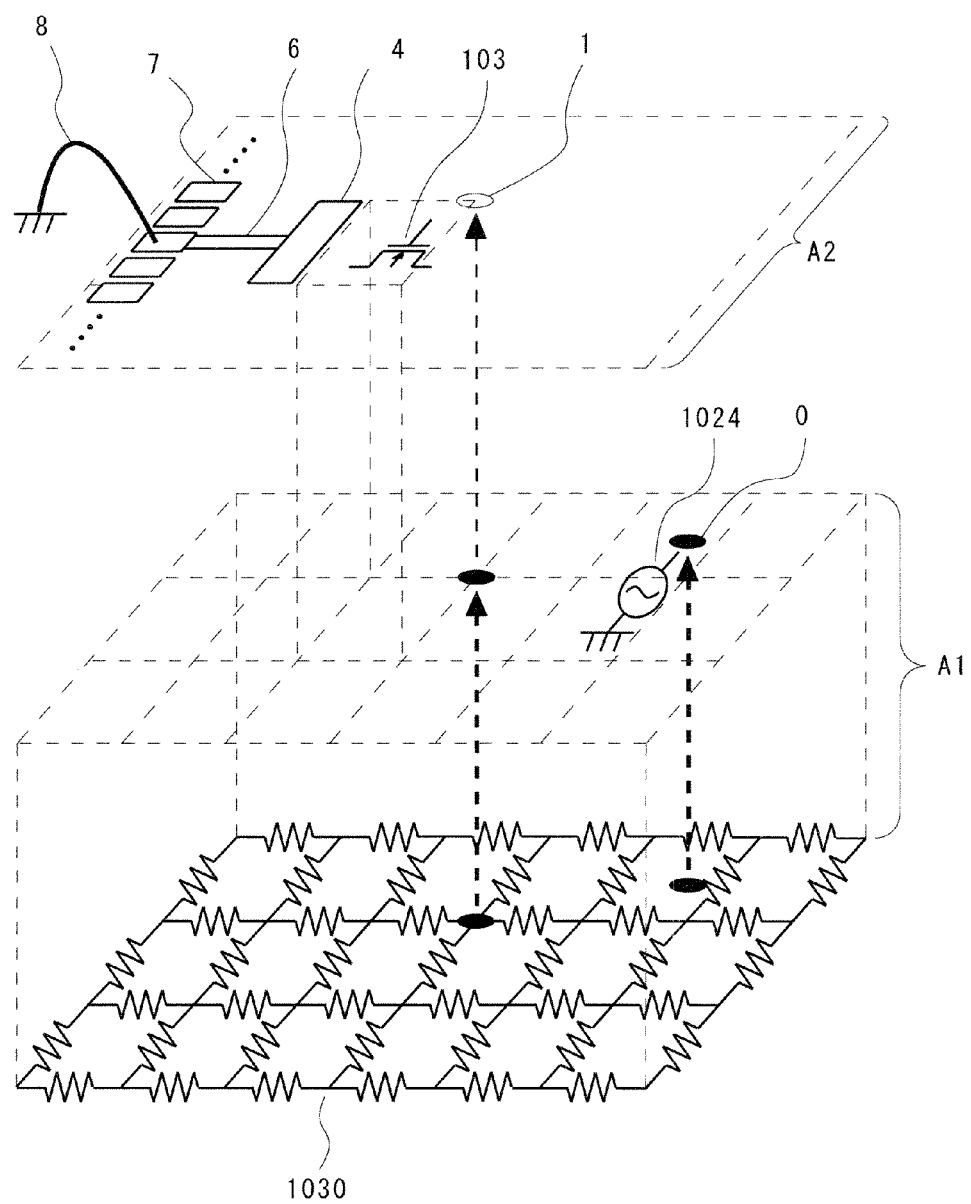
FIG. 3D is a view schematically showing chip-level noise analysis between a noise source on a semiconductor substrate and a connection point.

Next, the analysis of noise that propagates through the connection point into an element of the analog circuit is described. As shown in FIG. 3D, in the above-described chip-level noise analysis, the connection point 1 (first point), which is one of intersections of the resistor mesh 1030, can be regarded as a propagation noise output terminal to the transistor 103. On the other hand, in the element-level noise analysis, the connection point 1 (first point) can be regarded as a noise input terminal to the transistor 103. Thus, information of propagation noise to the position of the transistor 103 that has been obtained as a result of the chip-level noise analysis can be used directly for the element-level noise analysis. In FIG. 3D, the symbol A1 corresponds to the chip-level noise analysis, and the symbol A2 corresponds to the element-level noise analysis.

Further, by using the connection point 1 (first point) as a common node to pass propagation noise, the chip-level noise analysis and the element-level noise analysis can be performed independently of each other. This enables each of the analyses to be made optimally and independently. In this embodiment, the connection point 1 (first point) is used in common to thereby focus on the element-level noise analysis, so that it is possible to analyze the effect of noise on elements in the analog circuit in more detail. The element-level noise analysis is implemented by using a noise analysis model described hereinbelow.

Figure 4:
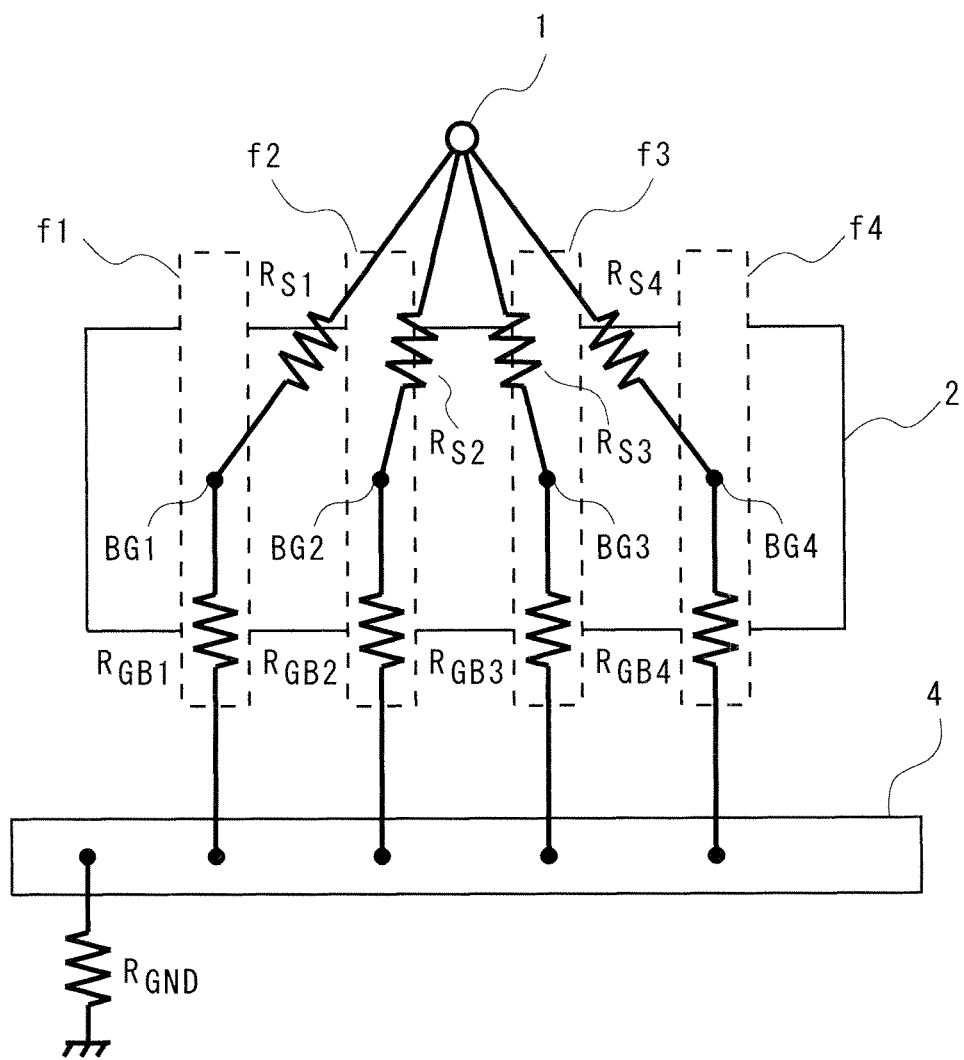
FIG. 4 is a top view schematically showing a model structure of a noise analysis model 100 used in an element-level noise analysis method according to the first embodiment.

FIG. 4 is a top view schematically showing a model structure of a noise analysis model 100 that is used in the element-level noise analysis method according to the first embodiment. The noise analysis model 100 is a model for a MOS transistor having a plurality of gate fingers. As shown in FIG. 4, in the noise analysis model 100, a diffusion layer 2 to form a source/drain region is formed on the semiconductor substrate (not shown). On the diffusion layer 2, gate fingers f1 to f4 are formed. Further, on the semiconductor substrate (not shown), a guard band 4 that is grounded through a ground resistor $R_{GND}$ is formed. The ground resistor $R_{GND}$ represents a line resistance component of the metal line 6 that connects from the guard band 4 to the pad 7 shown in FIG. 3A, for example. Although the case where four gate fingers are formed is shown in FIG. 4, the number of gate fingers is not limited to four as a matter of course.

The noise analysis model 100 is constructed by disposing a resistance model in the above-described transistor structure. First, resistors $R_{S1}$ to $R_{S4}$ are respectively disposed between the connection point 1 (first point) and center points BG1 to BG4 (second points), for example, in the semiconductor substrate just below back gates located under the gate fingers f1 to f4. The resistors $R_{S1}$ to $R_{S4}$ represent resistance components acting on noise that propagates through the semiconductor substrate from the connection point 1 (first point) to each of the points BG1 to BG4 (second points) in the semiconductor substrate just below the back gates. Note that, to clearly indicate that the resistors $R_{S1}$ to $R_{S4}$ are connected to the back gates in the semiconductor substrate, the positions of the gate fingers f1 to f4 are shown by dotted lines.

Further, resistors $R_{GB1}$ to $R_{GB4}$ are respectively disposed between the points BG1 to BG4 (second points) in the semiconductor substrate just below the back gates located under the gate fingers f1 to f4 and the guard band 4. The resistors $R_{GB1}$ to $R_{GB4}$ represent resistance components acting on noise that propagates through the semiconductor substrate from the points BG1 to BG4 (second points) in the semiconductor substrate just below the back gates to the guard band 4.

Figure 5A:
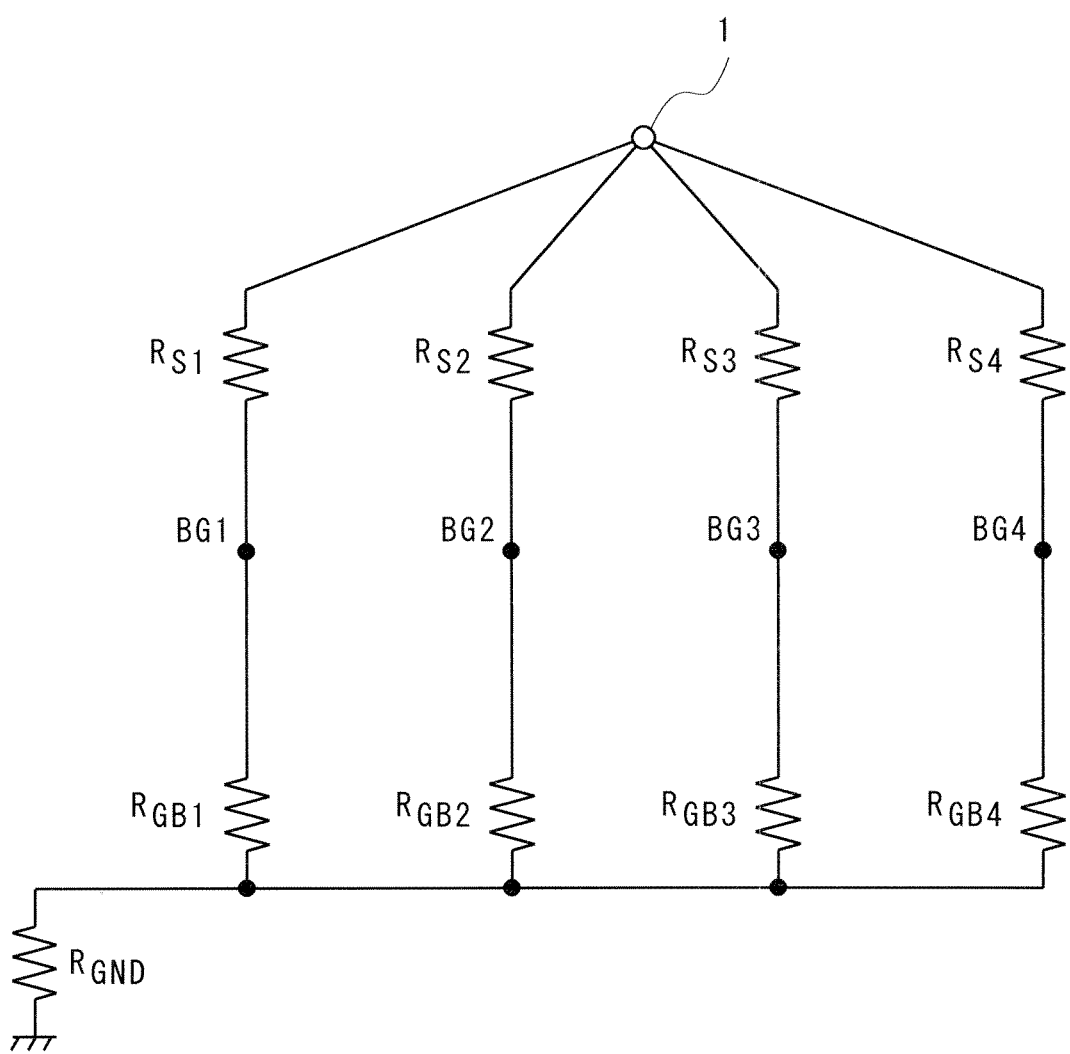
FIG. 5A is an equivalent circuit diagram of the noise analysis model 100 according to the first embodiment.

FIG. 5A is an equivalent circuit diagram of the noise analysis model 100 according to the first embodiment. As shown in FIG. 5A, the propagation path of noise acting on the back gates located under the gate fingers f1 to f4 is represented by two resistors connected in series between the connection point 1 (first point) and the guard band 4, and a ground resistor of the guard band 4.

Figure 5B:
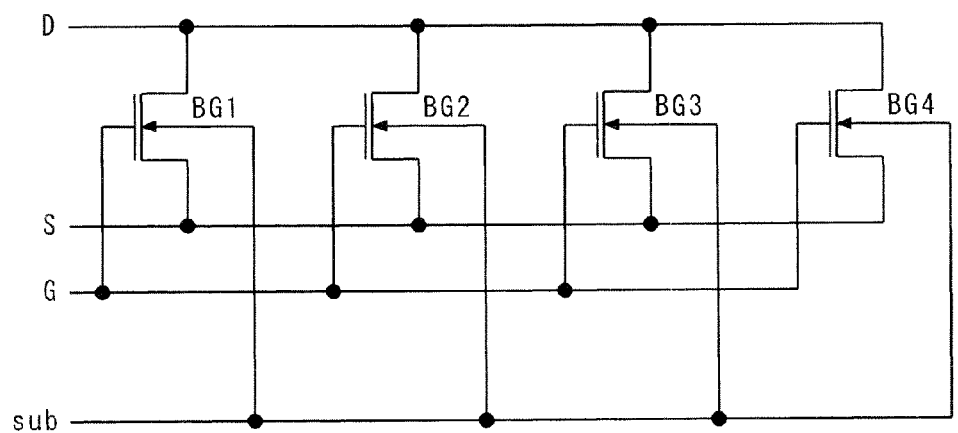
FIG. 5B is a circuit diagram showing an equivalent circuit of a transistor main body composed of a diffusion layer 2 and gate fingers f1, f2, f3 and f4 shown in FIG. 4.

FIG. 5B is a circuit diagram showing an equivalent circuit of a transistor main body that is composed of the diffusion layer 2 and the gate fingers f1, f2, f3 and f4 shown in FIG. 4. In the element-level noise analysis, the noise analysis model (FIG. 5A) that contributes to noise propagation and the equivalent circuit of the transistor main body (FIG. 5B) are combined at the points BG1 to BG4 (second points) in the semiconductor substrate just below the back gates, thereby enabling the element-level noise analysis. In this manner, by using the transistor equivalent circuit upon which the transistor layout is reflected (FIG. 5B) and further using the noise analysis model upon which the actual gate finger layout is reflected (FIG. 5A), high-accurate noise analysis can be achieved.

Figure 5C:
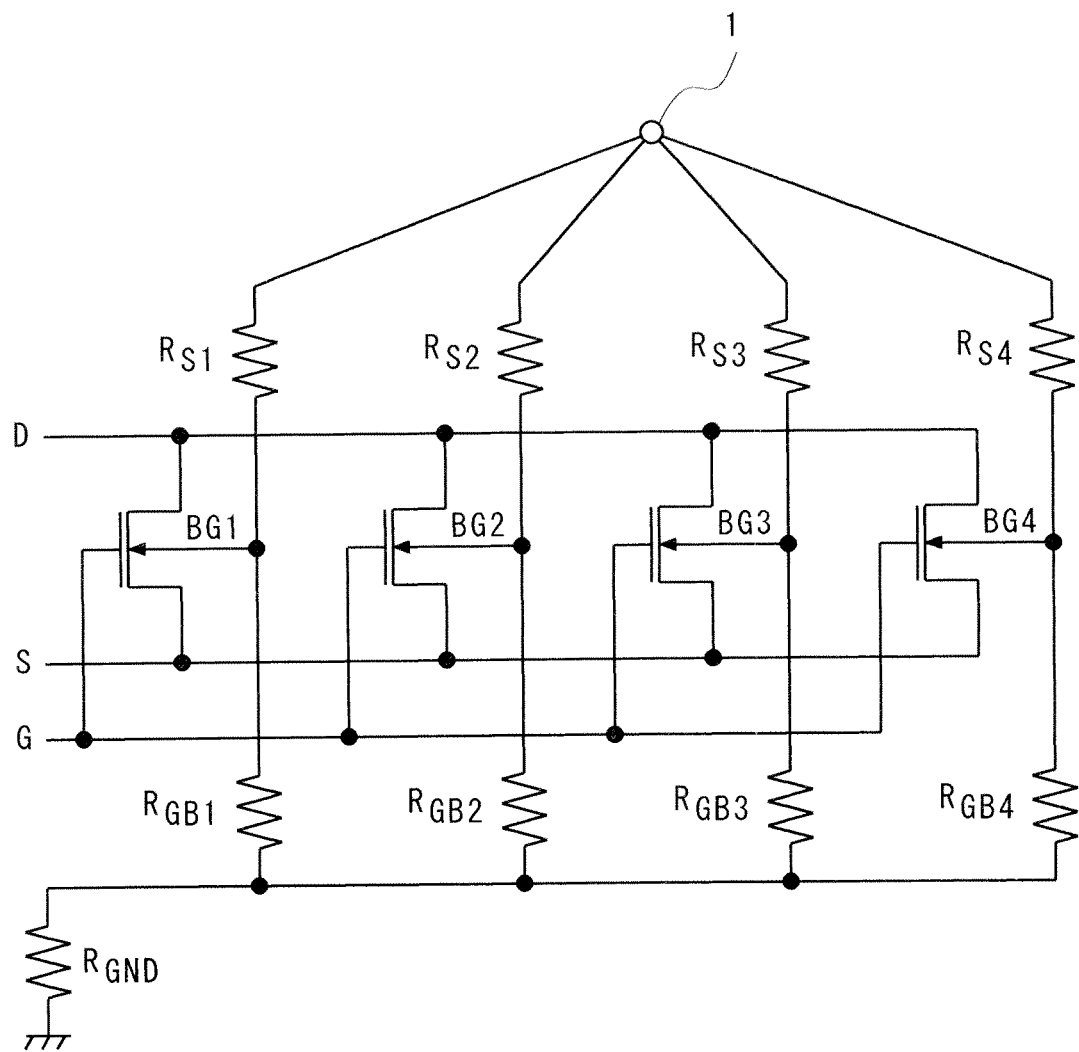
FIG. 5C is a circuit diagram showing an equivalent circuit of a noise analysis circuit 100 and a transistor main body in the case of using NMOS transistors.
Figure 5D:
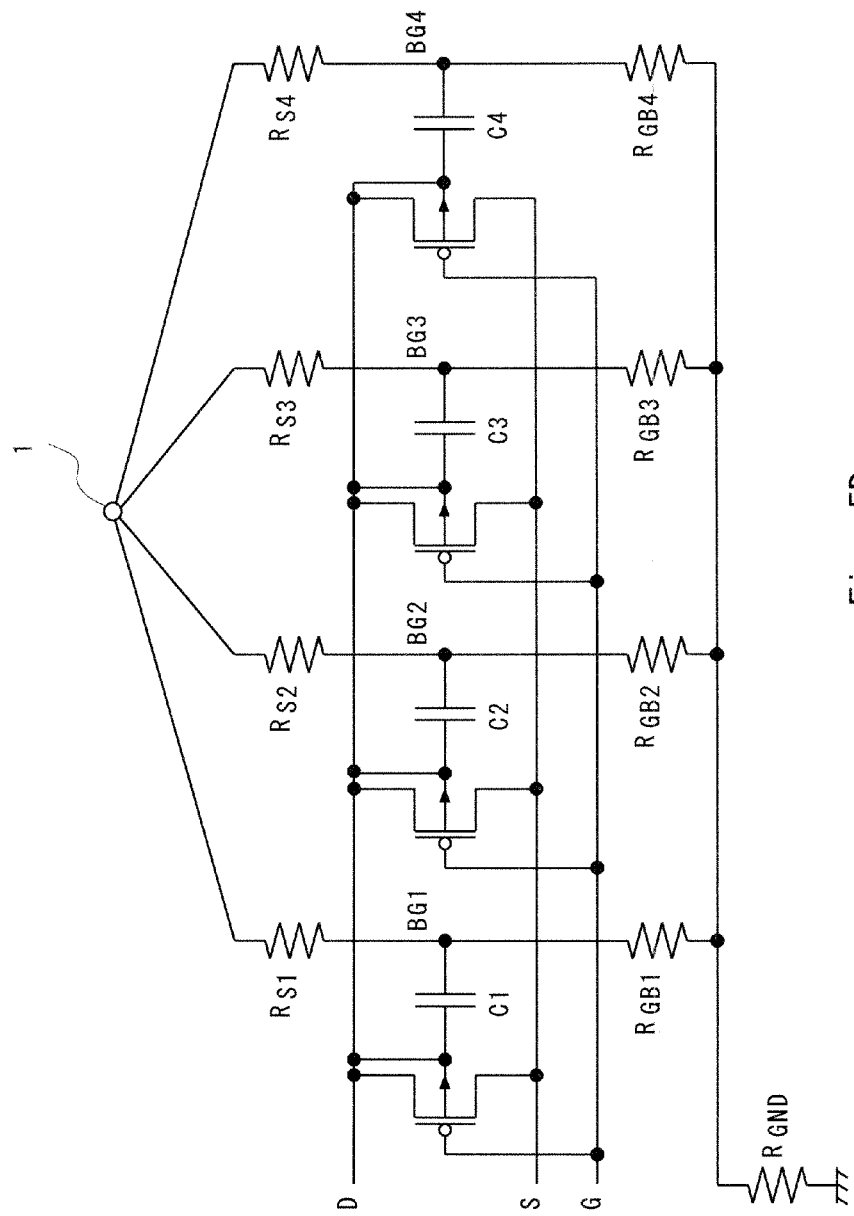
FIG. 5D is a circuit diagram showing an equivalent circuit of a noise analysis circuit 100 and a transistor main body in the case of using PMOS transistors.

FIG. 5C is a circuit diagram showing an equivalent circuit of the noise analysis circuit 100 and the transistor main body in the case of using NMOS transistors. FIG. 5D is a circuit diagram showing an equivalent circuit of the noise analysis circuit 100 and the transistor main body in the case of using PMOS transistors. In FIG. 5D, parasitic capacitance components are shown in addition. The same noise analysis model that contributes to noise propagation (FIG. 5A) is used in both cases of NMOS transistors and PMOS transistors as in the case of NMOS transistors, elements are different in FIG. 5D in that PMOS transistors are used in the equivalent circuit of the transistor main body. In addition, in the case of PMOS transistors, an N-well is formed in the semiconductor substrate (P-type silicon), and a transistor is formed in the N-well in its cross-sectional structure. Therefore, as shown in FIG. 5D, N-well parasitic capacitance components exist respectively between the back gates of the transistors and the points BG1 to BG4 (second points) in the semiconductor substrate just below the back gates. In FIG. 5D, the parasitic capacitance components are represented by the parasitic capacitors C1 to C4. In this manner, by adding the parasitic capacitance components to the element-level noise analysis model, the analysis accuracy can be further enhanced.

Figure 6:
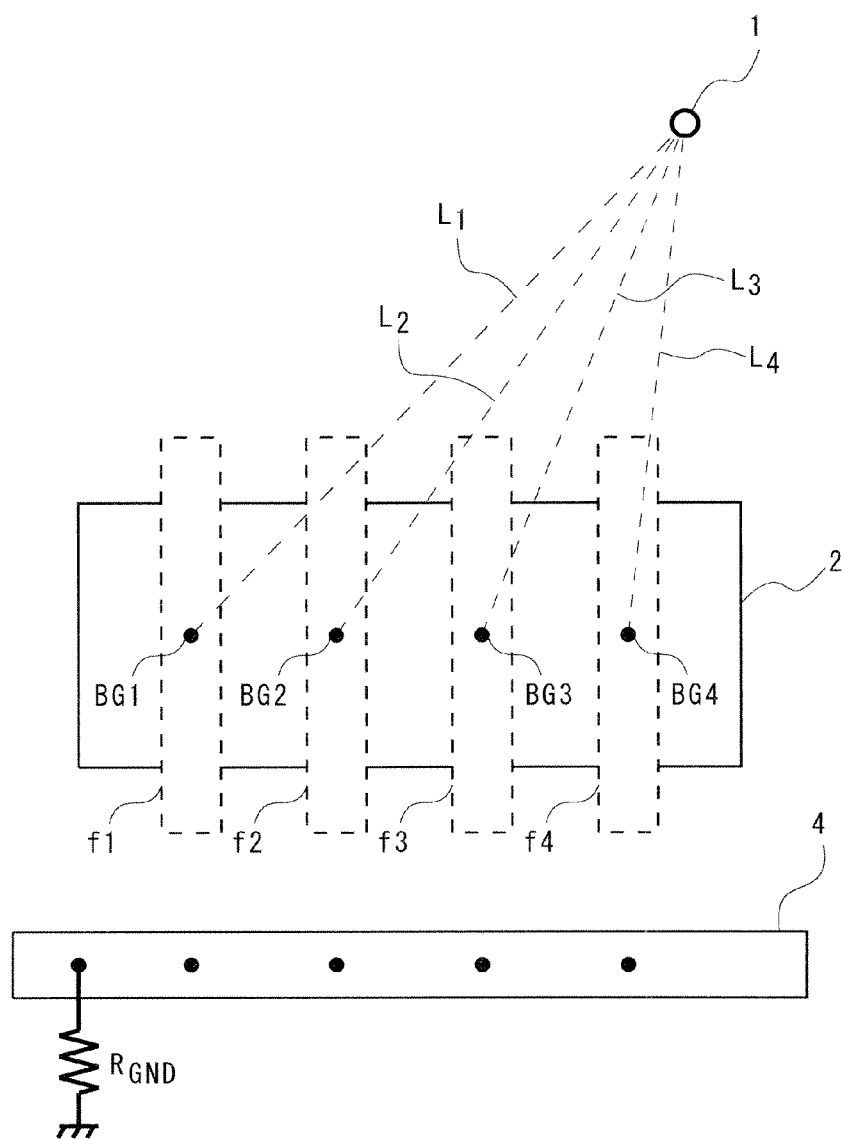
FIG. 6 is a top view of a noise analysis model showing a method of determining resistance values of resistors $R_{S1}$ to $R_{S4}$.

A method of determining the resistance values of the resistors $R_{S1}$ to $R_{S4}$ and the resistors $R_{GB1}$ to $R_{GB4}$ is described hereinbelow. FIG. 6 is a top view of the noise analysis model showing a method of determining the resistance values of the resistors $R_{S1}$ to $R_{S4}$. As shown in FIG. 6, the resistance values of the resistors $R_{S1}$ to $R_{S4}$ are determined in proportion to the distance between the connection point 1 (first point) and the point (second point) in the semiconductor substrate just below the back gate. For example, if the distance between the connection point 1 (first point) and a point BGi in the semiconductor substrate just below each back gate is $L_i$, the resistance values of the resistors $R_{S1}$ to $R_{S4}$ are represented by the following equation (1) where c is an arbitrary coefficient and i is an integer satisfying $1 \leq i \leq 4$.

$$R_{Si} = c \cdot L_i \qquad \text{Equation (1)}$$

Figure 7:
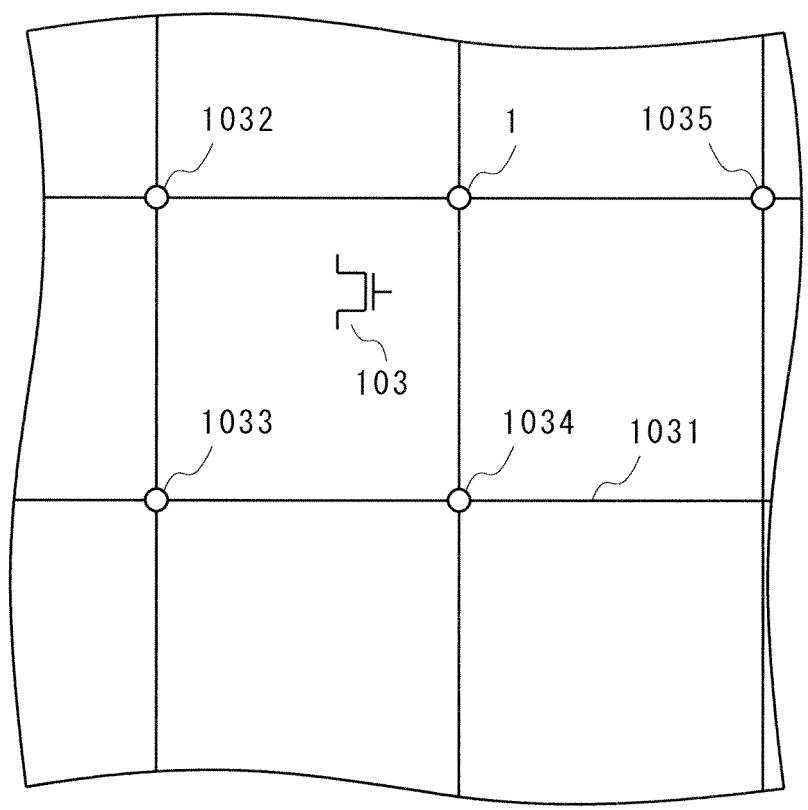
FIG. 7 is a top view of a substantial part schematically showing a positional relationship between a transistor and a connection point 1 represented by the noise analysis model 100.

As the connection point 1 (first point), the intersection of the resistor mesh which is located closest to the transistor represented by the noise analysis model 100 is selected. FIG. 7 is a top view of a substantial part of the resistor mesh 1030 (resistor elements are not shown) schematically showing a positional relationship between a transistor and the connection point 1 (first point) represented by the noise analysis model 100. The transistor 103 represented by the noise analysis model 100 is placed on the semiconductor substrate in which the resistor mesh (the resistor mesh structure shown in FIG. 3A) is configured. The position of the transistor 103 on the semiconductor substrate can be easily calculated from the netlist. As shown in FIG. 7, the resistor mesh segmented with boundaries 1031 has points of intersection of the boundaries 1031. In this embodiment, the intersection of the boundaries 1031 which is located closest to the transistor 103 that is sufficiently smaller than the resistor mesh is set as the connection point 1 (first point).

As described above, the resistance values of the resistors $R_{S1}$ to $R_{S4}$ are proportional to the distance between the connection point 1 (first point) and the points BG1 to BG4 (second points) in the semiconductor substrate just below the back gates. Thus, the resistance values of the resistors $R_{S1}$ to $R_{S4}$ are the lowest when the distance between the connection point 1 (first point) and the points BG1 to BG4 (second points) in the semiconductor substrate just below the back gates is the shortest. Therefore, by setting the intersection of the boundaries 1031 which is the closest to the transistor 103 as the connection point 1 (first point), it is possible to analyze the noise that has the highest voltage level and has the most dominant effect on the operation of the transistor among noise which propagates to the hack gates. In the case of making more detailed analysis, noise analysis using a plurality of noise analysis models may be performed by creating noise analysis models in which intersections 1032 to 1035 other than the connection point 1 (first point) are set as the connection point.

Figure 8:
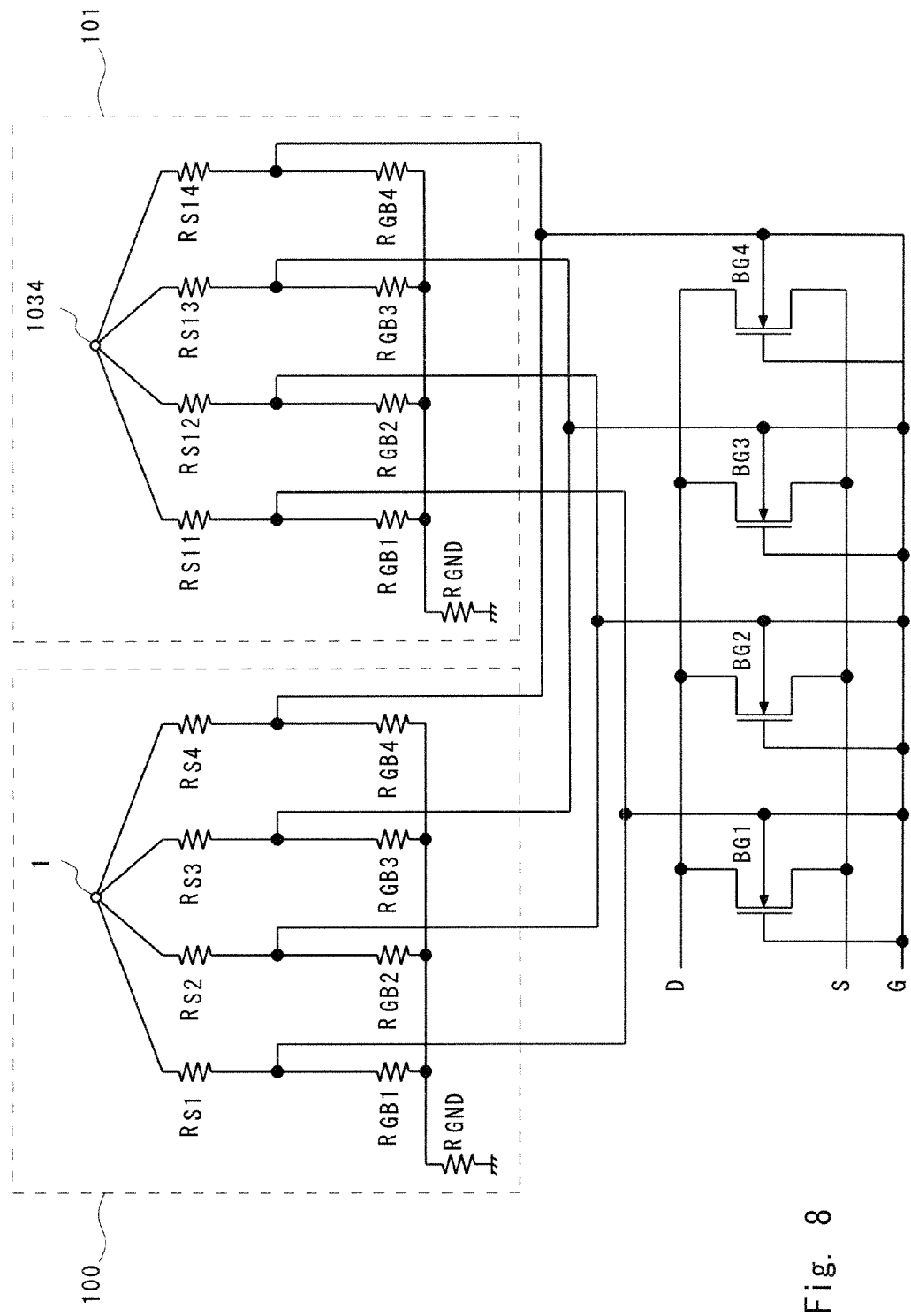
FIG. 8 is a circuit diagram showing a circuit configuration in the case of using a plurality of noise analysis models.

FIG. 8 is a circuit diagram showing a circuit configuration in the case of using a plurality of noise analysis models. FIG. 8 shows the state in consideration of the case where noise propagates and enters through the connection point 1034 shown in FIG. 7 in addition to the case where noise is input from the connection point 1 (first point). Therefore, compared with FIG. 5C, a noise analysis model 101 is constructed in addition to the noise analysis model 100. The noise analysis model 101 has the same configuration as the noise analysis model 100. However, because the noise analysis model 101 is connected to the connection point 1034, resistance components from the connection point to each of the points BG1 to BG4 (second points) in the semiconductor substrate just below the back gates are different from those of the noise analysis model 100. Accordingly, resistors corresponding to the resistors $R_{S1}$ to $R_{S4}$ of the noise analysis circuit 100 are indicated as $R_{S11}$ to $R_{S14}$.

Figure 9:
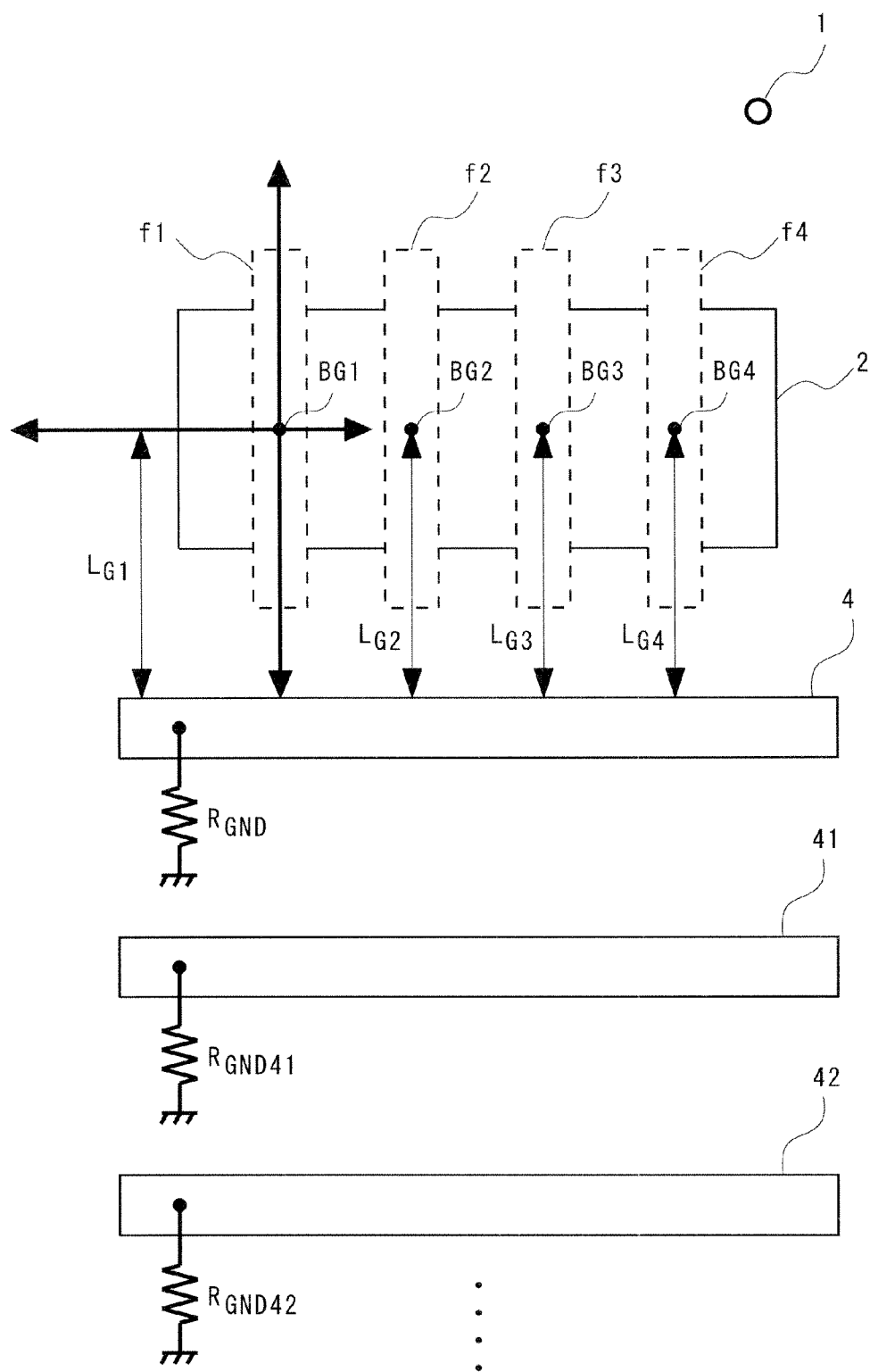
FIG. 9 is a top view of a noise analysis model showing a method of determining resistance values of resistors $R_{GB1}$ to $R_{GB4}$.

FIG. 9 is a top view of a noise analysis model showing a method of determining resistance values of resistors $R_{GB1}$ to $R_{GB4}$. As shown in FIG. 9, the resistance values of the resistors $R_{GB1}$ to $R_{GB4}$ are determined in proportion to the distance between the point (second point) in the semiconductor substrate just below the back gate and the guard band. For example, if the distances between the points BG1 to BG4 (second points) in the semiconductor substrate just below the respective back gates and the guard band are $L_{G1}$ to $L_{G4}$, respectively, the resistance values of resistors $R_{GB1}$ to $R_{GB4}$ are represented by the following equation (2) where d is an arbitrary coefficient.

$$R_{GBi} = d \cdot L_{Gi} \qquad \text{Equation (2)}$$

Guard bands are formed in several places on the semiconductor substrate. In this embodiment, the guard band that is the closest to the point (second point) in the semiconductor substrate just below each back gate is selected. As shown in FIG. 9, guard bands in the left, right, up and down directions with respect to the point BG1 in the semiconductor substrate just below the back gate are searched, for example. On the semiconductor substrate, guard bands 41 and 42, for example, are formed in addition to the guard band 4, and, in this embodiment, the points BG1 to BG4 (second points) in the semiconductor substrate just below the back gates are connected to the closest guard band 4. Although the point BG1 in the semiconductor substrate just below the back gate is used as a reference, the points BG2 to BG4 in the semiconductor substrate just below the back gates may be used instead. Further, the guard bands may be searched with respect to the points BG1 to BG4 (second points) in the semiconductor substrate just below the back gates, and the guard band at the shortest average distance from the points BG1 to BG4 (second points) in the semiconductor substrate just below the back gates may be used.

As described above, the resistance values of resistors $R_{GB1}$ to $R_{GB4}$ are proportional to the distance between the point (second point) in the semiconductor substrate just below the back gate and the guard band. Thus, the resistance values of resistors $R_{GB1}$ to $R_{GB4}$ are the lowest when the distance between the point (second point) in the semiconductor substrate just below the back gate and the guard band is the shortest. Therefore, by connecting the points BG1 to BG4 (second points) in the semiconductor substrate just below the back gates to the guard band at the position closest to the points BG1 to BG4 (second points) in the semiconductor substrate just below the back gates, it is possible to analyze the noise that has the highest voltage level and has the most dominant effect on the operation of the transistor among noise which propagates through the points BG1 to BG4 (second points) in the semiconductor substrate just below the back gates. In the case of making more detailed analysis, noise analysis using a plurality of noise analysis models may be performed by creating noise analysis models in consideration of the connection with guard bands other than the guard band 4 located at the shortest distance. In this case, analysis in which another noise analysis model in which at least the values of $R_{GB1}$ to $R_{GB4}$ and $R_{GND}$ are different is added and connected is performed (not shown) in the same way as in FIG. 8.

Figure 10:
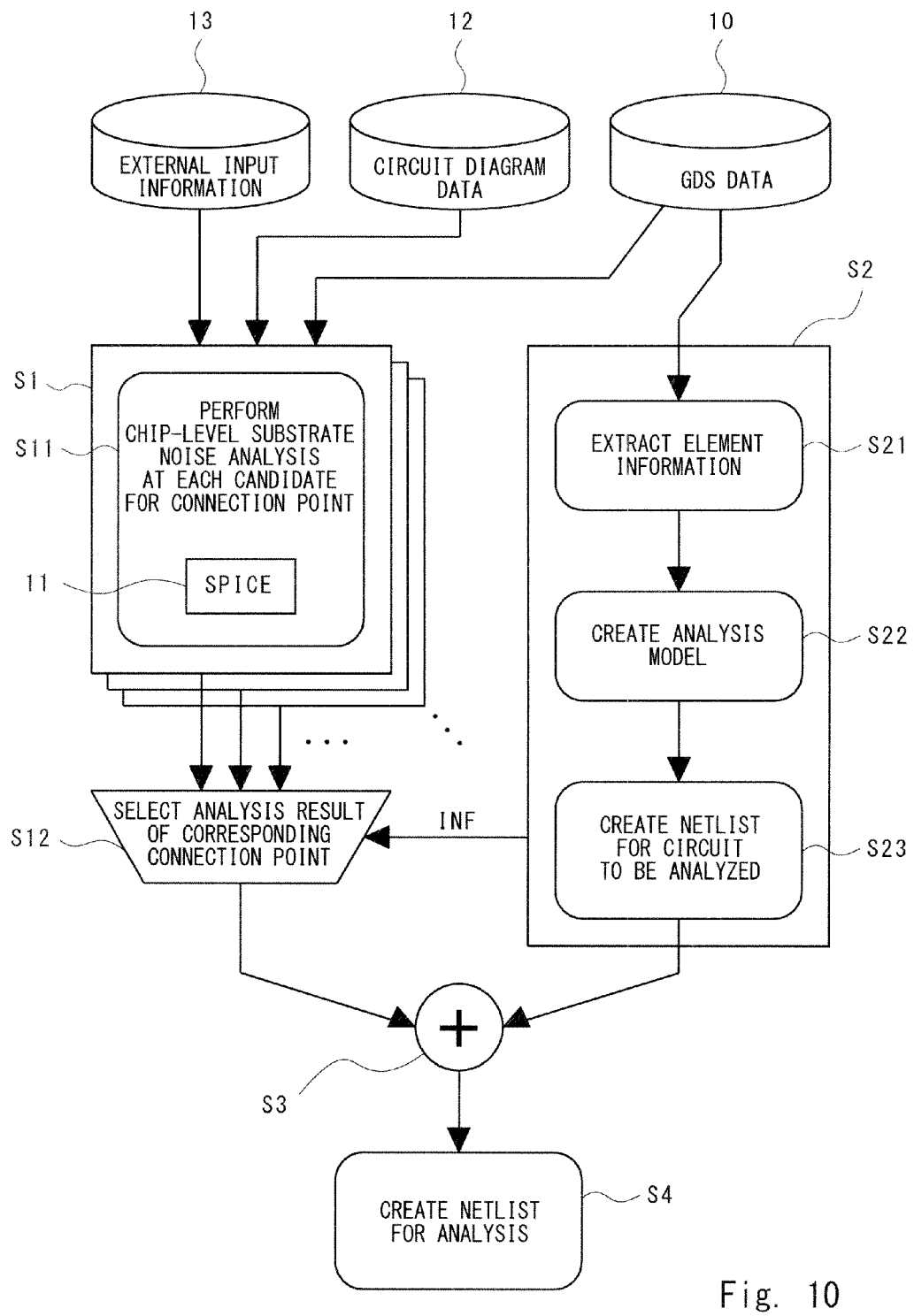
FIG. 10 is a flowchart showing the flow of a noise analysis method according to the first embodiment.

A specific procedure of a noise analysis method according to this embodiment is described hereinafter. FIG. 10 is a flowchart showing the flow of a noise analysis method according to the first embodiment. In this noise analysis method, noise analysis is performed on the basis of GDS data 10 and circuit diagram data 12 indicating circuit layout information of the semiconductor device and external input information 13 such as bias setting and input and control signals. Note that although the GDS data is used as the information indicating the circuit layout of the semiconductor device in FIG. 10, layout data in another format may be used.

First, as shown in FIG. 10, chip-level substrate noise analysis from the noise source to the connection point 1 (first point) is performed (Step S1). In Step S1, the chip-level substrate noise analysis is performed using the GDS data 10 and the circuit diagram data 12 and the external input information 13 such as bias setting and input and control signals by SPICE (Simulation Program with Integrated Circuit Emphasis, denoted by the reference symbol 11 in FIG. 10), for example (Step S11). Specifically, analysis on noise propagation through the substrate is performed by the SPICE 11, and voltage waveforms of noise at candidates for the connection point is acquired from a plurality of (for example, n where n is an integer of one or larger) intersections of the resistor mesh. The voltage level of noise at each candidate for the connection point is thereby acquired. Then, according to information INF at the connection point 1 (first point) determined in Step S2, which is described later, one corresponding to the connection point 1 (first point) is selected among the noise voltage waveforms at the candidates for the connection point (Step S12), the selected one is combined with an element-level analysis model (Step S2), which is described later (Step S3), and then final analysis is executed (Step S4). Note that, by using a frequency as a parameter when performing the analysis on noise propagation through the substrate, the voltage-level frequency characteristics of noise at each candidate for the connection point can be acquired.

On the other hand, the flow (Step S2) to perform element-level noise analysis in a circuit to be analyzed such as the analog circuit that is connected to the connection point 1 (first point) is described. In Step S2, position information of the circuit to be analyzed such as the analog circuit is extracted from the GDS data 10 by a typical LPE (Layout Parameter Extractor) tool, for example. Then, element information containing the extracted position information of elements such as transistors to receive substrate noise within the circuit to be analyzed and parasitic elements in the layout is extracted (Step S21).

Figure 11:
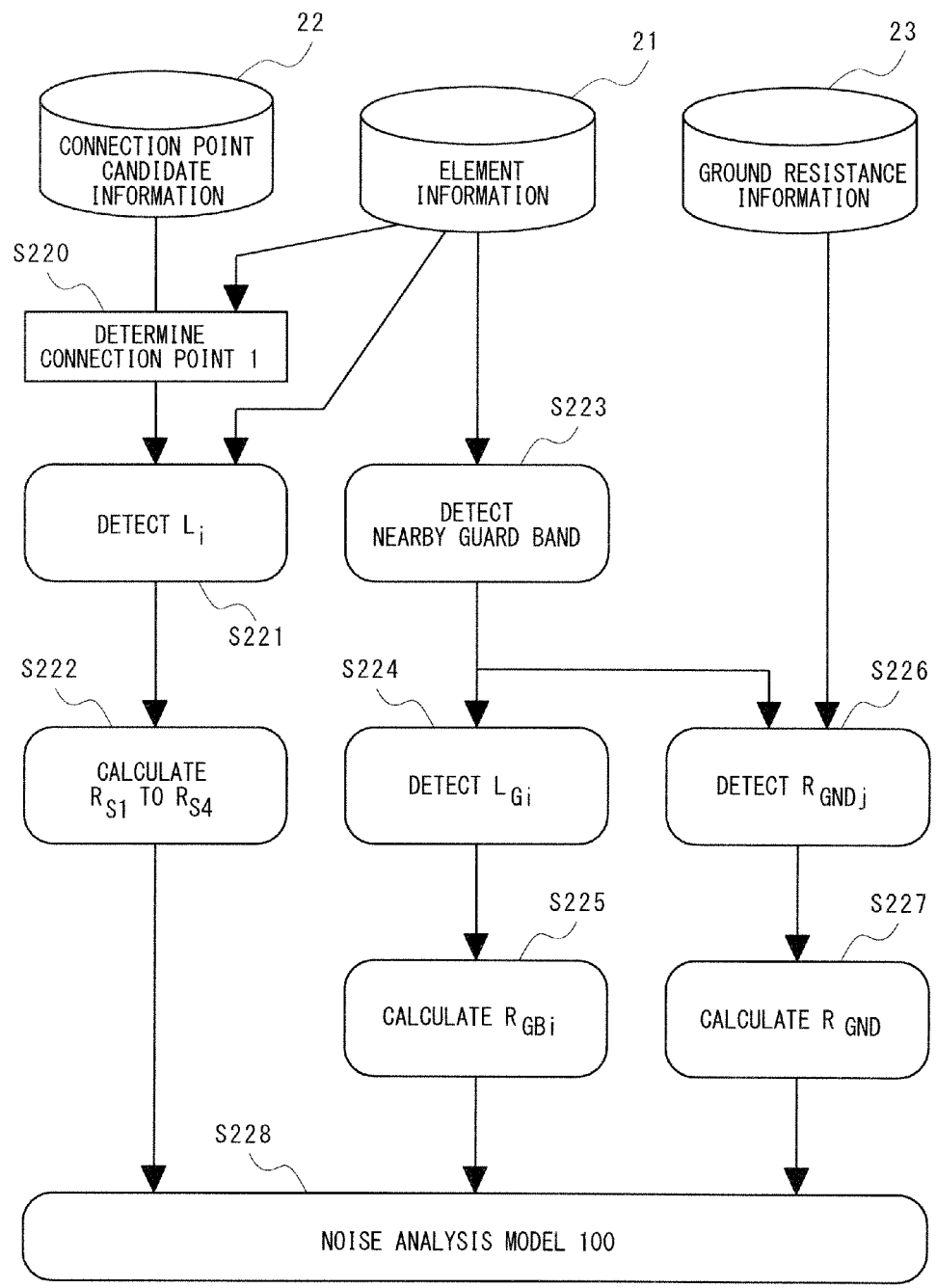
FIG. 11 is a flowchart showing details of Step S22 of the flow of creating the noise analysis model 100 according to the first embodiment.

Next, the analysis model shown in FIG. 4 is created for the transistor for which the element information such as the position information has been extracted (Step S22). FIG. 11 is a flowchart showing details of Step S22 of the flow of creating the noise analysis model 100 according to the first embodiment. In Step S22, the connection point 1 (first point) for the transistor to be analyzed is determined using the element information 21 extracted in Step S21 and the connection point candidate position information 22 extracted in Step S1 (Step 220). Then, the distance $L_i$ between the point (second point) in the semiconductor substrate just below each back gate of the transistor to be analyzed and the connection point 1 (first point) is detected (Step S221). After that, the distance $L_i$ is substituted into the equation (1), and the resistance of the resistors values $R_{S1}$ to $R_{S4}$ that are respectively connected to the points BG1 to BG4 (second points) in the semiconductor substrate just below the back gates, for example, are calculated (Step S222).

Further, the guard bands in the vicinity of the transistor to be analyzed are detected using the element information 21 extracted in Step S21 (Step S223). Generally, it is preferred to detect the guard band located at the shortest distance first. Then, the distance $L_{Gi}$ between the point (second point) in the semiconductor substrate just below each back gate of the transistor to be analyzed and the guard band is detected (Step S224). After that, the distance $L_{Gi}$ is substituted into the equation (2), and the resistance values of the resistors $R_{GB1}$ to $R_{GB4}$ that are respectively connected to the points (second points) in the semiconductor substrate just below the back gates, for example, are calculated (Step S225).

Further, regarding the resistance value of the ground resistor $R_{GND}$ that is connected to the guard band 4, the ground resistance $R_{GNDj}$ of each guard band is detected using the guard band detected in Step S223 and ground resistance information 23 such as a resistance component of the line layer from the detected guard band to the pad (Step S226). Then, the ground resistance $R_{GND}$ acting on the guard band 4 is detected (Step S227). The noise analysis model 100 shown in FIG. 4 is then created on the basis of the resistance $R_{S1}$ to $R_{S4}$, $R_{GB1}$ to $R_{GB4}$ and the ground resistance $R_{GND}$, for example (Step S228). Note that, a plurality of transistors are included in the analog circuit to be analyzed, and the noise analysis model 100 may be created for each of the transistors in the above manner.

Then, a netlist of the circuit to be analyzed into which the noise analysis model 100 created in Step S22 is incorporated is created (Step S23).

After that, the chip-level substrate noise analysis result obtained in Step S1 is integrated into the netlist of the circuit to be analyzed created in Step S2 (Step S21 to S23) (Step S3). A netlist for analysis that allows noise analysis on elements of the circuit to be analyzed can be thereby created (Step S4). As is already described in the description of FIG. 3D, the chip-level substrate noise analysis in Step S1 and the element-level substrate noise analysis in Step S2 are integrated at the connection point 1 (first point), and the connection point 1 (first point) serves as the output terminal of noise in the chip-level substrate noise analysis and serves as the input terminal of noise in the element-level substrate noise analysis, thus acting as a point at which noise information is passed.

As described above, the noise analysis method according to this embodiment can create the netlist for analysis into which the noise analysis model 100 to evaluate the effect on elements in the circuit to be analyzed is incorporated. By performing SPICE simulation, for example, with use of the netlist for analysis, it is possible to perform output waveform analysis of the semiconductor device in consideration of the effect of substrate noise at the element level. Further, because passing of information necessary for chip-level and element-level noise analyses is ensured through the connection point 1 (first point), the analyses at the respective levels can be made independently of each other. Further, higher resolution can be made only for the element-level noise analysis in the circuit to be analyzed for which high-resolution noise analysis is required, without increasing the mesh resolution of the chip-level noise analysis. Accordingly, the noise analysis method and the noise analysis model allow an analysis result to be obtained within a practical analysis time.

Note that, in the case where it is necessary to reduce the effect of noise as a result of the output waveform analysis of the semiconductor device, re-design of the layout or the like may be made. Particularly, in the noise analysis method according to this embodiment, the resistance values of the resistors $R_{GB1}$ to $R_{GB4}$ depend on the distance between the point (second point) in the semiconductor substrate just below the back gate and the guard band in the creation of the noise analysis model 100. It is thereby possible to change the resistance values of the resistors $R_{GB1}$ to $R_{GB4}$ by changing the position of the guard band. For example, by bringing the guard band at the shortest distance from the point (second point) in the semiconductor substrate just below the back gate closer to the point (second point) in the semiconductor substrate just below the back gate, the voltage drop at the resistors $R_{GB1}$ to $R_{GB4}$ can be reduced. Consequently, the voltage drop at the resistors $R_{S1}$ to $R_{S4}$ increases, so that the voltage level of noise that reaches the back gate can be reduced. Accordingly, with use of the analysis result by the noise analysis method according to this embodiment, it is possible to easily decide the design policy to reduce the effect of substrate noise on elements in the circuit to be analyzed at the time of making circuit layout design of the semiconductor device.

Second Embodiment

Figure 12:
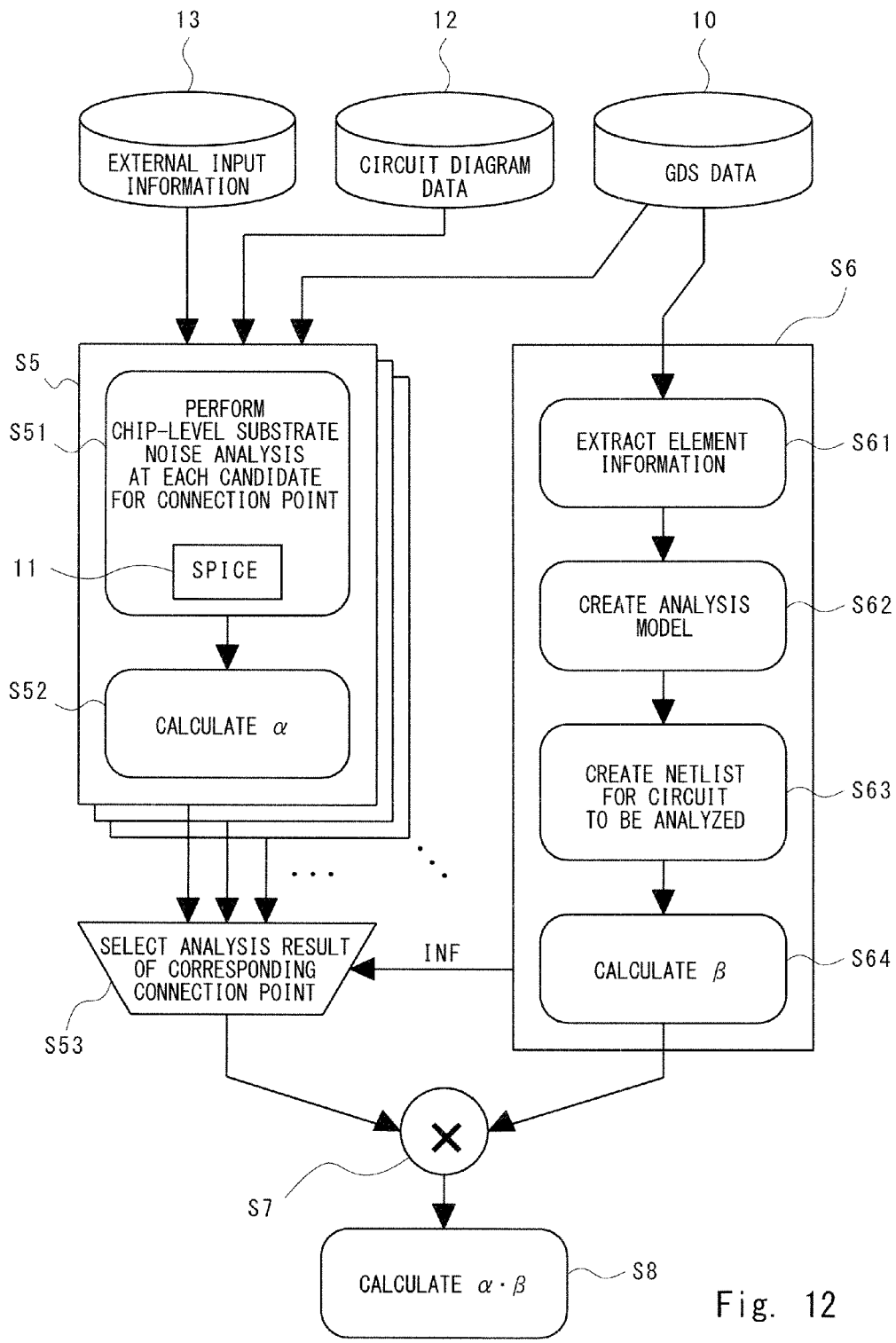
FIG. 12 is a flowchart showing the flow of a noise analysis method according to a second embodiment.

An element-level noise analysis method according to a second embodiment of the present invention is described hereinafter. Although the same noise analysis model 100 as in the first embodiment is used in this embodiment, a specific procedure is different. Differences of the noise analysis method according to the second embodiment from that of the first embodiment are described hereinbelow. FIG. 12 is a flowchart showing the flow of the noise analysis method according to the second embodiment. In this noise analysis method also, noise analysis is performed on the basis of the GDS data 10 and the circuit diagram data 12 indicating circuit layout information of the semiconductor device and the external input information 13 such as bias setting and input and control signals just like in the first embodiment. Note that although the GDS data is used as the information indicating the circuit layout of the semiconductor device in FIG. 12, layout data in another format may be used as in the first embodiment.

First, as shown in FIG. 12, chip-level substrate noise analysis from the noise source to the connection point 1 (first point) is performed (Step S5). Step S51 in Step S5 is the same as Step S11 in FIG. 10 and thus not redundantly described.

After Step S51, the voltage waveform of the noise source and the voltage waveform at each candidate for the connection point are acquired from the analysis on noise propagation through the substrate in Step S51. Then, a chip-level substrate propagation coefficient α is calculated from the amplitude ratio of the voltage waveform of the noise source and the voltage waveform at each candidate for the connection point (Step S52). After that, according to information INF at the connection point 1 (first point) determined in Step S6, which is described later, one corresponding to the connection point 1 (first point) is selected among the noise voltage waveforms at the candidates for the connection point as described later, in the same manner as in FIG. 10 (Step S53).

On the other hand, element-level noise analysis in a circuit to be analyzed such as the analog circuit that is connected to the connection point 1 (first point) is performed (Step S6). Steps S61 to S63 in Step S6 are the same as Steps S21 to S23 in Step S2 in FIG. 10 and thus not redundantly described.

After Step S63, analysis on noise propagation through the substrate at the element level with use of the noise analysis model 100 is performed by a typical LPE tool, for example. Specifically, the analysis on noise propagation through the substrate is performed by a typical LPE tool, and the voltage waveform of noise that is output from the connection point 1 (first point) through the noise analysis model 100 is acquired. Further, the voltage waveform of the noise source is acquired. Then, an element-level substrate propagation coefficient β is calculated from the amplitude ratio of the voltage waveform at the connection point and the voltage waveform of noise output through the noise analysis model 100 (Step S64).

Then, the calculated chip-level substrate propagation coefficient α is multiplied by the calculated element-level substrate propagation coefficient β (Step S7) to thereby calculate a substrate propagation coefficient G=α·β (Step S8).

As described above, the noise analysis method according to this embodiment allows calculation of the substrate propagation coefficient G of noise in consideration of elements in the circuit to be analyzed by using the noise analysis model 100. It is thereby possible to quantitatively evaluate the effect of substrate noise on elements in the circuit to be analyzed. Therefore, the effect of noise on elements in the circuit to be analyzed such as the analog circuit can be evaluated in more detail than the case of performing the chip-level substrate noise analysis only.

EXAMPLE 1

Figure 13A:
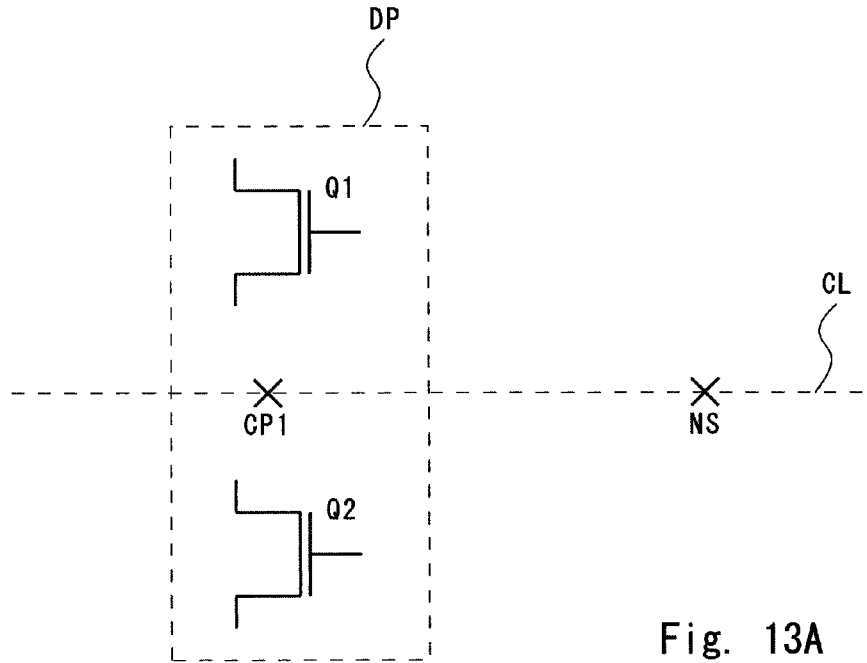
FIG. 13A is a top view schematically showing the layout of a semiconductor device used in noise analysis according to an example 1.
Figure 13B:
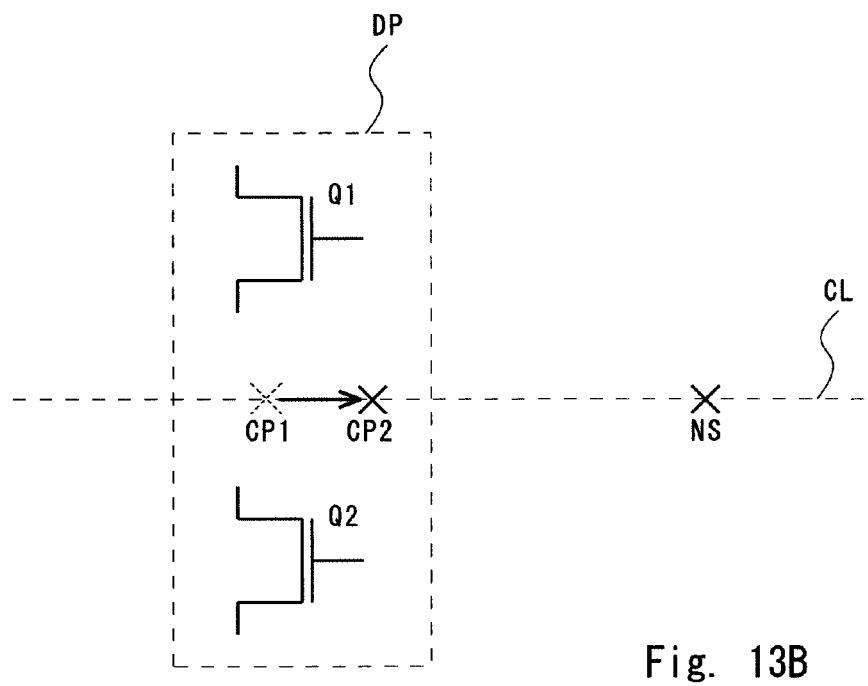
FIG. 13B is a top view schematically showing the layout of a semiconductor device used in noise analysis according to the example 1.

Example 1 of the noise analysis method according to the second embodiment is described hereinbelow. FIGS. 13A and 13B are top views schematically showing the layout of the semiconductor device that is used in the noise analysis according to the example 1. In FIGS. 13A and 13B, transistors Q1 and Q2 that form a differential pair DP are arranged in line symmetry with respect to a center line CL. Further, a noise source NS is placed on the center line CL outside the differential pair DP. In FIG. 13A, a connection point CP1 is placed at the midpoint between the transistors Q1 and Q2. In FIG. 13B, a connection point CP2 is placed at the position closer to the noise source NS by about 10 μm compared to the connection point CP1. Thus, CP1 is located closer to the differential pair than CP2 is. In such conditions, the dependence of the substrate propagation coefficient G on the transistors Q1 and Q2 was observed by changing the number of gate fingers of the transistors Q1 and Q2, which is the substantial channel width.

In the example 1, five types of transistors having ID of B01 to B05 with a different number of gate fingers were used. The gate finger width in the transistors B01 to B05 (the gate length of MOS transistors) was 0.1 μm, the gate finger length in the area where the gate finger and the source-drain diffusion layer are in contact (the gate width of MOS transistors for each finger) was 11.45 μm. The number gate fingers of the transistors B01 to B05 was 1, 2, 4, 8 and 16, respectively.

Figure 14A:
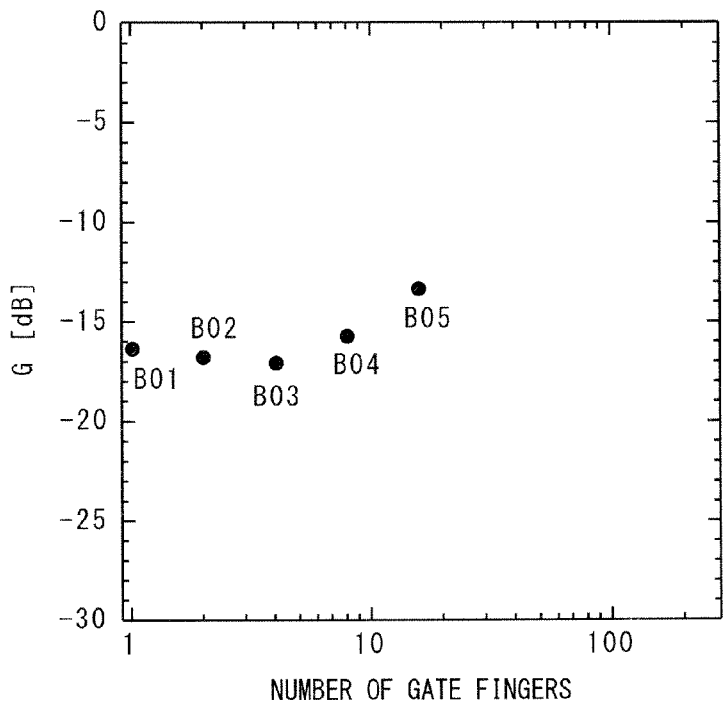
FIG. 14A is a graph showing the dependence of a substrate propagation coefficient G on the number of gate fingers in the layout shown in FIG. 13A.

FIG. 14A is a graph showing the dependence of the substrate propagation coefficient G on the number of gate fingers in the layout shown in FIG. 13A. In this case, the graph shows that, in the transistor with a large number of gate fingers, which is the transistor with a large substantial channel width, the sensitivity for the amount of substrate noise in each gate finger position is large. Therefore, the tendency is reproduced that a difference occurs in substrate noise sensitivity represented by the substrate propagation coefficient G depending on the size of the transistor that forms the analog circuit. Further, it shows that the model of this example that takes the shape of fingers into consideration is important in the element-level noise analysis as well to enhance the analysis accuracy.

Figure 14B:
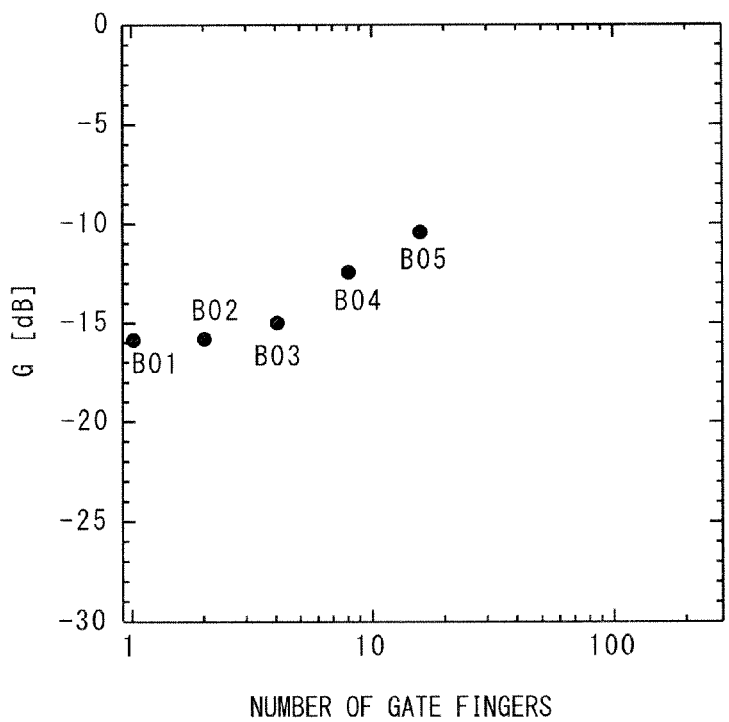
FIG. 14B is a graph showing the dependence of a substrate propagation coefficient G on the number of gate fingers in the layout shown in FIG. 13B.

FIG. 14B is a graph showing the dependence of the substrate propagation coefficient G on the number of gate fingers in the layout shown in FIG. 13B. In this case, the connection point CP2 is set at the position away from the transistor that forms the analog circuit in the direction toward the noise source. Thus, with respect to the differential pair, CP1 is set closer than CP2 is. As a result, the tendency is reproduced that the noise sensitivity relatively increases in the result of FIG. 14A where the connection point is closer to the differential pair. This result attests to the fact that "the resistance values of the resistors $R_{S1}$ to $R_{S4}$ are the lowest when the distance between the connection point 1 (first point) and the points BG1 to BG4 (second points) in the semiconductor substrate just below the back gates is the shortest. Therefore, by setting the intersection of the boundaries 1031 which is the closest to the transistor 103 as the connection point 1 (first point), it is possible to analyze the noise that has the highest voltage level and has the most dominant effect on the operation of the transistor among noise which propagates to the back gates", which is described earlier.

As described above, this example ensures that substrate noise response characteristics can be analyzed for each transistor. The example further ensures that the substrate noise response characteristics of transistors vary depending on the position of the connection point with respect to the analog circuit to be analyzed, for example.

The present invention is not restricted to the above-described embodiment, and various changes and modifications may be made without departing from the scope of the invention. For example, although the above-described example 1 is an example for the noise analysis method according to the second embodiment, the same result is obtained for the noise analysis method according to the first embodiment. Specifically, it can be concluded that it is preferred to set the connection point on the layout symmetry axis of the analog circuit to be analyzed in the noise analysis method according to the first embodiment as well. Further, it can be concluded that it is preferred to set the connection point as close as possible to the transistor that forms the analog circuit.

Although the case where the resistors $R_{GB1}$ to $R_{GB4}$ and the ground resistor $R_{GND}$ are connected to the guard band 4 is described in the above embodiment, this is just by way of illustration. Specifically, the resistors $R_{GB1}$ to $R_{GB4}$ and the ground resistor $R_{GND}$ are not necessarily connected to the guard band as long as they are connected to a fixed potential region to which a fixed potential is supplied.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A noise analysis model stored in a non-transitory storage device and executed by a computer, the noise analysis model comprising:
   a first resistor that serves as a substrate resistor in a semiconductor substrate between a first point set in the semiconductor substrate between a noise source and a transistor to which substrate noise from the noise source propagates through the semiconductor substrate and a second point set in the semiconductor substrate just below a back gate of the transistor;
   a second resistor that serves as a substrate resistor in the semiconductor substrate between the second point and a fixed potential region near the transistor; and
   a third resistor that serves as a line resistor of a line connecting the fixed potential region and a power pad that supplies a ground potential,
   wherein element level noise analysis and substrate level noise analysis are independently performed from each other through the first point set as a common node to pass propagation noise, and
   the noise analysis model is used for the element level noise analysis.

2. The noise analysis model according to claim 1, wherein a resistance value of the first resistor is determined in proportion to a distance between the first point and the second point.

3. The noise analysis model according to claim 1, wherein the fixed potential region is a guard band connected to a fixed potential.

4. The noise analysis model according to claim 3, wherein a resistance value of the second resistor is determined in proportion to a distance between the fixed potential region and the second point.

5. The noise analysis model according to claim 3, wherein the fixed potential region is closer to the noise analysis model compared to other fixed potential regions different from the fixed potential region.

6. The noise analysis model according to claim 1, wherein the first point is one of points at which a level of substrate noise is calculated by chip-level substrate noise analysis of a semiconductor device formed on the semiconductor substrate.

7. The noise analysis model according to claim 6, wherein the first point is a point closest to the noise analysis model among the points at which a level of substrate noise is calculated.

8. A noise analysis model stored in a non-transitory storage device and executed by a computer, the noise analysis model comprising:
   a first resistor that serves as a substrate resistor in a semiconductor substrate between a first point set in the semiconductor substrate between a noise source and a transistor to which substrate noise from the noise source propagates through the semiconductor substrate and a second point set in the semiconductor substrate just below a back gate of the transistor;
   a second resistor that serves as a substrate resistor in the semiconductor substrate between the second point and a fixed potential region near the transistor; and
   a third resistor that serves as a line resistor of a line connecting the fixed potential region and a power pad that supplies a ground potential,
   wherein the transistor has a plurality of split gates including a finger structure, and each of the first resistor and the second resistor is connected to the second point in the semiconductor substrate just below a back gate of each of the plurality of split gates.

9. A noise analysis method stored in a non-transitory storage device and executed by a computer, the noise analysis method comprising:
   creating a noise analysis model by specifying a position of a transistor in a circuit to be analyzed of a semiconductor device, setting a first point in the semiconductor substrate on a path where substrate noise propagates from a noise source to the transistor through a semiconductor substrate on which the semiconductor device is formed, setting a second point in the semiconductor substrate just below a back gate of the transistor, disposing a first resistor that serves as a substrate resistor in the semiconductor substrate between the first point and the second point at a position between the first point and the second point, disposing a second resistor that serves as a substrate resistor in the semiconductor substrate between the second point and a fixed potential region near the transistor at a position between the second point and the fixed potential region, and disposing a third resistor that serves as a line resistor of a line connecting the fixed potential region and a power pad that supplies a ground potential at a position between the fixed potential region and the power pad;
   creating a netlist of the circuit to be analyzed containing the noise analysis model; and analyzing an effect of substrate noise reaching the transistor by using the netlist of the circuit to be analyzed, wherein element level noise analysis and substrate level noise analysis are independently performed from each other through the first point set as a common node to pass propagation noise, and the noise analysis model is used for the element level noise analysis.

10. The noise analysis method according to claim 9, wherein a level of substrate noise at a point on the semiconductor substrate is calculated by chip-level substrate noise analysis of the semiconductor device, and the point at which a level of substrate noise is calculated to be set as the first point.

11. The noise analysis method according to claim 10, wherein a second noise propagation coefficient is calculated from an amplitude ratio of a waveform of substrate noise in the noise source and a signal waveform of the substrate noise at the first point.

12. The noise analysis method according to claim 11, wherein a third noise propagation coefficient is calculated by multiplying the first noise propagation coefficient by the second noise propagation coefficient.

13. The noise analysis method according to claim 10, wherein the first point is one of a plurality of points at which a level of substrate noise is calculated by chip-level substrate noise analysis of the semiconductor device.

14. The noise analysis method according to claim 13, wherein the first point is a point closest to the noise analysis model among the plurality of points at which a level of substrate noise is calculated.

15. The noise analysis method according to claim 9, wherein the transistor has a plurality of split gates including a finger structure, and each of the first resistor and the second resistor is connected to the second point in the semiconductor substrate just below a back gate of each of the plurality of split gates.

16. The noise analysis method according to claim 9, wherein a resistance value of the first resistor is determined in proportion to a distance between the first point and the second point.

17. The noise analysis method according to claim 9, wherein the fixed potential region is a guard band connected to a fixed potential.

18. The noise analysis method according to claim 17, wherein a resistance value of the second resistor is determined in proportion to a distance between the fixed potential region and the second point.

19. The noise analysis method according to claim 17, wherein the fixed potential region is closer to the noise analysis model compared to other fixed potential regions different from the fixed potential region.

20. A noise analysis method stored in a non-transitory storage device and executed by a computer, the noise analysis method comprising:

creating a noise analysis model by specifying a position of a transistor in a circuit to be analyzed of a semiconductor device, setting a first point in the semiconductor substrate on a path where substrate noise propagates from a noise source to the transistor through a semiconductor substrate on which the semiconductor device is formed, setting a second point in the semiconductor substrate just below a back gate of the transistor, disposing a first resistor that serves as a substrate resistor in the semiconductor substrate between the first point and the second point at a position between the first point and the second point, disposing a second resistor that serves as a substrate resistor in the semiconductor substrate between the second point and a fixed potential region near the transistor at a position between the second point and the fixed potential region, and disposing a third resistor that serves as a line resistor of a line connecting the fixed potential region and a power pad that supplies a ground potential at a position between the fixed potential region and the power pad;

creating a netlist of the circuit to be analyzed containing the noise analysis model; and analyzing an effect of substrate noise reaching the transistor by using the netlist of the circuit to be analyzed, wherein a first noise propagation coefficient is calculated from an amplitude ratio of an output waveform of a first signal input to the first point and a waveform of a second signal output through the noise analysis model contained in the netlist of the circuit to be analyzed.

* * * * *